United States Patent [19]
Viles et al.

[11] 3,882,891
[45] May 13, 1975

[54] CHECK VALVE

[75] Inventors: Alan H Viles; Gary C. Smith, Jr., both of Columbus, Ohio

[73] Assignee: Abex Corporation, New York, N.Y.

[22] Filed: June 19, 1974

[21] Appl. No.: 480,795

[52] U.S. Cl. .......................... 137/512.15; 137/525.5
[51] Int. Cl. ............................................ F16k 15/14
[58] Field of Search ... 137/525, 512.4, 375, 512.15, 137/525.3, 525.5; 251/DIG. 3, 362

[56] References Cited
UNITED STATES PATENTS

| | | | |
|---|---|---|---|
| 894,286 | 7/1908 | Reineking | 137/525 |
| 1,860,163 | 4/1930 | Wyzenbeek | 137/512.4 |
| 3,603,341 | 9/1971 | Scaramucci | 137/375 |

FOREIGN PATENTS OR APPLICATIONS

| | | | |
|---|---|---|---|
| 8,316 | 6/1903 | United Kingdom | 137/512.15 |

Primary Examiner—William R. Cline
Assistant Examiner—H. Jay Spiegel
Attorney, Agent, or Firm—Thomas S. Baker, Jr.; David A. Greenlee

[57] ABSTRACT

A check valve for radial ports in a fluid conductor has a resilient partially cylindrical member having a pair of legs biased against a surface on the conductor to close the ports to prevent fluid flow in one direction whereas fluid in the ports moves the legs away from the surface to permit fluid flow through the ports in the opposite direction.

1 Claim, 6 Drawing Figures

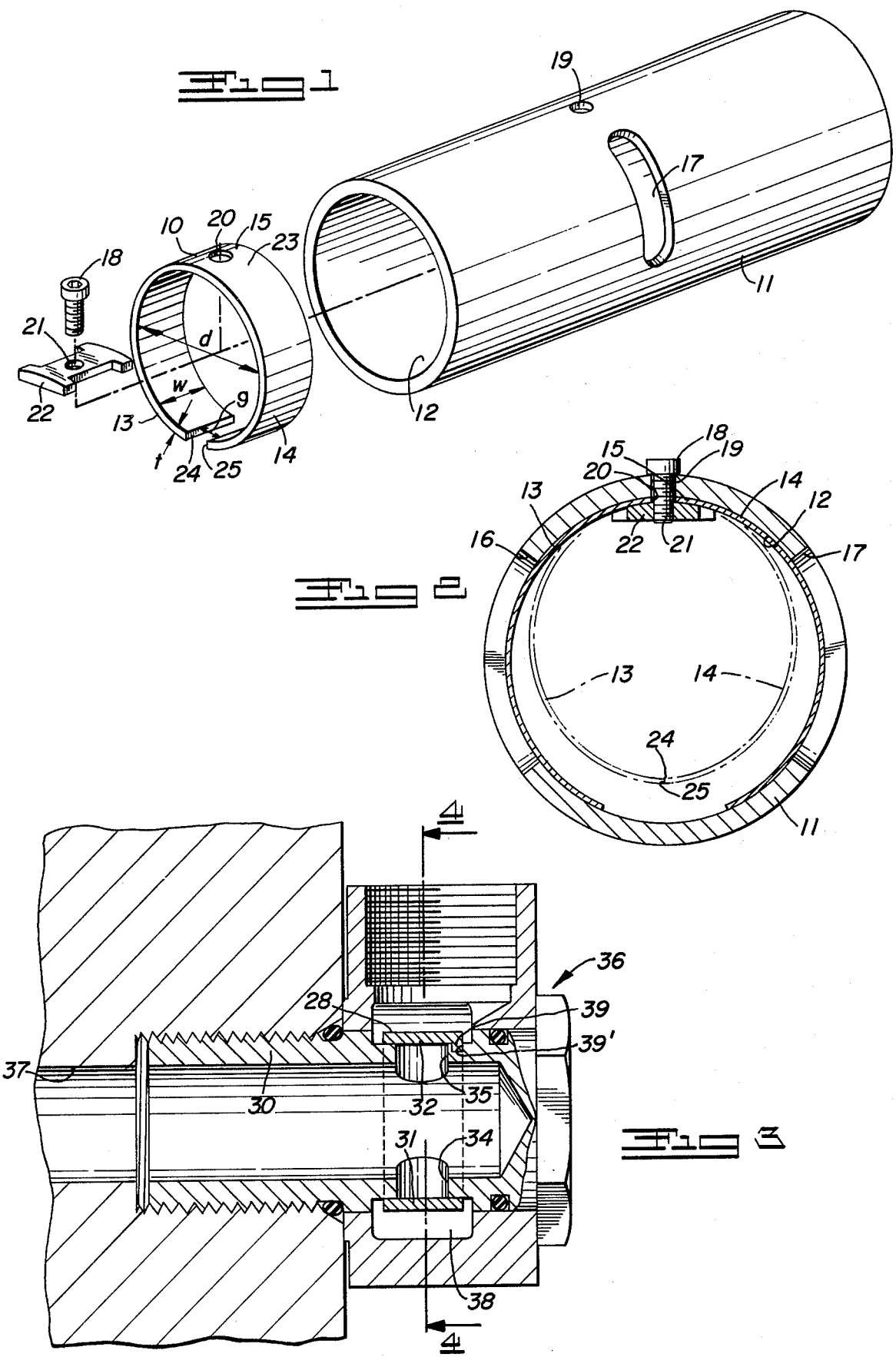

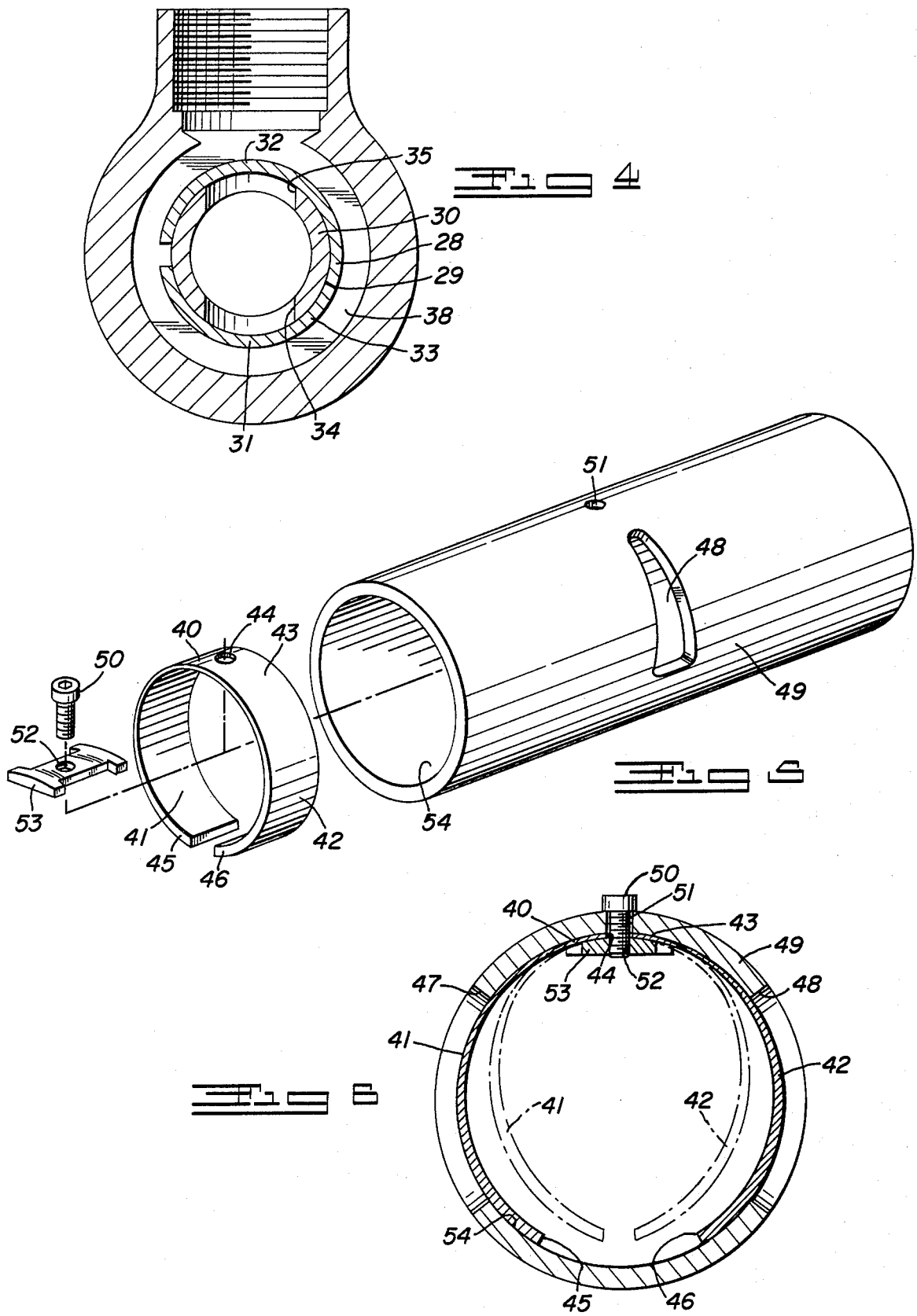

CHECK VALVE

BACKGROUND OF THE INVENTION

I. Field of the Invention

The instant invention relates generally to check valves, and more specifically to such a valve used to control fluid flow through a radial port in a cylindrical fluid conducting member.

II. Description of the Prior Art

A cylindrical fluid conductor having a check valve covering a port in the sidewall is shown in U.S. Pat. No. 1,854,518 — Little. In this structure, a plurality of radial ports open into a tapering, annular groove on the outer surface of the fluid conductor. A complementary tapered elastomeric ring fits in the groove and covers the ports. Pressurized fluid in the conductor flows through the ports and past the ring which moves away from the ports when fluid is flowing out of the conductor but seals tightly when exposed to pressure outside of the conductor.

In U.S. Pat. No. 2,671,466 — Conrad, a cylindrical fluid conductor has a plurality of radial ports which open into a tapered groove which receives a metal ring and an elastomeric ring. Pressurized fluid flows through the ports and past the two rings which move radially outward to uncover the ports but seal against the walls of the groove when exposed to fluid pressure outside of the conductor. The metal ring prevents the elastomeric ring from cold flowing into the ports when exposed to outside pressure.

A disadvantage of the aforementioned check valves is that they can only pass fluid out of a fluid conductor; they cannot pass fluid into the conductor.

It is desirable to provide a check valve for a radial port in a fluid conductor which can be used to pass fluid either to or from the fluid conductor.

SUMMARY OF THE INVENTION

It is an object of the instant invention to provide a check valve for a radial port in a cylindrical fluid conductor which can be used to permit unidirectional movement of fluid flowing either to or from the fluid conductor.

It is another object of the instant invention to provide a check valve for a radial port in a cylindrical fluid conductor having a resilient member with the legs biased against the conductor to cover the port and movable to allow pressurized fluid to flow through the port past the legs of the member.

It is a further object of the instant invention to provide such a check valve for ports having an enlarged area in which the resilient member legs increase in thickness to the ends which cover enlarged port areas to provide increased strength in the area of greatest flow.

In one embodiment of the instant invention, a resilient member of a check valve is fastened to the inner surface of a fluid conductor to cover a pair of ports. Fluid pressure outside the conductor moves the member legs to uncover the ports to enable fluid to flow into the conductor. Pressure from inside the fluid conductor moves the member legs against the inner surface to block the ports.

In another embodiment of the invention, a resilient member of a check valve is fitted over the outside surface of a fluid conductor to cover a pair of ports. Pressurized fluid inside the conductor moves the member legs away from the port to enable fluid to flow out of the conductor. Pressure outside the conductor moves the legs against the outside surface to block the ports.

DESCRIPTION OF THE DRAWINGS

FIG. 1 is an exploded perspective view of one embodiment of the check valve of the instant invention.

FIG. 2 is a sectional view of the assembled check valve of FIG. 1.

FIG. 3 is a sectional view of a second embodiment of a check valve of the instant invention.

FIG. 4 is a sectional view along the line 4—4 of FIG. 3.

FIG. 5 is a view similar to FIG. 1 showing another embodiment with the shape of the check valve and port changed.

FIG. 6 is a sectional view of the assembled valve of FIG. 5.

DETAILED DESCRIPTION

The first embodiment of the check valve 10 of the instant invention is shown in FIGS. 1 and 2. Check valve 10 is a resilient part-cylindrical metal band having an unstressed diamater slightly larger than the inside diameter of fluid conductor 11 such that it is normally biased to the solid line position against inner surface 12, as shown in FIG. 2. In this position, each of the legs 13, 14 of check valve 10 which are joined by a common area 15 close respective elongated radial ports 16, 17 formed in the conductor 11. A bolt 18 passes through a bore 19, a bore 20 and into a threaded bore 21 in a clamp 22 to retain check valve 10 in conductor 11.

In operation, pressurized fluid outside of conductor 11 moves legs 13, 14 radially inwardly to open the ports 16, 17 to permit fluid flow into conductor 11. Movement of legs 13, 14 is limited to the phantom line position shown in FIG. 2 in which surfaces 24, 25 at the ends of the respective legs 13, 14 abut to prevent excessive bending and ultimate breakage.

The clamp 22 prevents the legs 13, 14 from bending in the area of the bore 20 which is the weakest section of the valve 10.

It has been found that if check valve 10 has a width $w$ of 0.500 in., a thickness $t$ of 0.044 in., an outside diameter $d$ of 1.500 in., a gap $g$ of 0.314 in. and is inserted into conductor 11 which has inside diameter of 1.495 in. that fluid at 10 psi in ports 16, 17 will begin to open the valve 10. Valve 10 will move to the maximum open position where legs 13, 14 abut with less than 100 psi in the ports 16, 17. Check valve 10 has successfully handled fluid flowing at 100 gallons per minute at 100 psi.

The outer surface 23 of check valve 10 may be coated with an elastomeric or thermoplastic material to provide improved sealing means around the ports 16, 17.

A second embodiment of the instant invention is shown in FIGS. 3 and 4, in which a check valve 28 is positioned on the outer surface 29 of a fluid conductor 30. Legs 31, 32 of valve 28 are joined by a common area 33 and close respective ports 34, 35 in the conductor 30 which is shown positioned within a banjo fitting 36.

In operation, pressurized fluid in bore 37 passes into fluid conductor 30 and ports 34, 35. The fluid moves legs 31, 32 away from conductor 30 and open ports 34, 35 to permit fluid flow from conductor 30 into space 38. Check valve 28 is positioned on fluid conductor 30 by tangs 39 which are bent into slots 39' seen in FIG. 3.

A modified form of check valve is shown in FIGS. 5 and 6. In this embodiment, a check valve 40 has legs 41, 42 which are joined by a common area 43 and which increase in thickness from the common area 43 to their respective outer ends 45, 46. Ports 47, 48 in fluid conductor 49 are tapered as shown in FIG. 5 such that they increase in area such that the greatest area underlie the outer ends 45, 46 of legs 41, 42. A bolt 50 passes through a bore 51, a bore 44, and into a threaded bore 52 of a clamp 53 to retain the check valve 40 as shown in FIG. 6.

In operation, pressurized fluid outside of conductor 49 moves legs 41, 42 inwardly to enable fluid to pass through ports 46, 47. Since legs 41, 42 are thinner at the common area 43, they tend to pivot about clamp 53 to the phantom line position shown in FIG. 6. This moves the outer ends 45, 46 farther away from the inner wall 54 to accommodate the increased flow through the enlarged area of the ports 47, 48. The greater thickness of the outer ends 45, 46 of the respective legs 41, 42 is necessary to resist the high pressure fluid coming through the enlarged port areas.

Thus, the check valve of the instant invention is of simple construction, can accommodate a relatively high fluid flow rate and can be adapted to provide unidirectional flow either radially outwardly from a fluid conductor or radially inwardly into a fluid conductor.

Obviously, those skilled in the art may make various changes in the details and arrangements of parts without departing from the spirit and scope of the invention as it is defined by the claims hereto appended. Applicant, therefore, wishes not to be restricted to the precise construction herein disclosed.

Having thus described and shown in the embodiment of the invention, what is desired to secure by Letters Patent of the United States is:

We claim:

1. In a check valve for a cylindrical fluid conductor having a pair of radial ports formed in the fluid conductor; the improvement comprising a resilient partially cylindrical member having a pair of legs joined by a common area and biased against a surface of the conductor to close the ports against fluid flow in one direction but responsive to pressurized fluid in the ports to move away from the fluid conductor to open the ports to enable fluid flow therethrough in the other direction; the resilient member biased against the inner surface of the fluid conductor; means for retaining the resilient member against the inner surface, whereby the pressurized fluid in the ports biases both legs inwardly to open both ports and enable fluid to flow into the fluid conductor; the thickness of each leg increases from the common area to its outer end, each port is tapered such that a larger area is covered by the outer end of a leg and the pressurized fluid in the ports causes the legs to bend mainly at the common area such that the outer ends of the legs will move a greater distance from the inner surface to allow greater fluid flow through the larger port area.

* * * * *